(12) United States Patent
Eigel et al.

(10) Patent No.: US 11,118,933 B2
(45) Date of Patent: Sep. 14, 2021

(54) METHOD AND SYSTEM FOR PROVIDING AN AUTOMATION FUNCTION FOR A TRANSPORTATION VEHICLE

(71) Applicant: VOLKSWAGEN AKTIENGESELLSCHAFT, Wolfsburg (DE)

(72) Inventors: Thomas Eigel, Berlin (DE); Stefan Detering, Braunschweig (DE); Andreas Stele, Wolfsburg (DE); Timur Aminev, Braunschweig (DE)

(73) Assignee: VOLKSWAGEN AKTIENGESELLSCHAFT

( * ) Notice: Subject to any disclaimer, the term of this patent is extended or adjusted under 35 U.S.C. 154(b) by 202 days.

(21) Appl. No.: 16/411,719

(22) Filed: May 14, 2019

(65) Prior Publication Data

US 2019/0353498 A1 Nov. 21, 2019

(30) Foreign Application Priority Data

May 18, 2018 (DE) ...................... 10 2018 207 869.6

(51) Int. Cl.
*G01C 21/36* (2006.01)
*B62D 15/02* (2006.01)
*G08G 1/0962* (2006.01)

(52) U.S. Cl.
CPC ....... *G01C 21/3691* (2013.01); *B62D 15/026* (2013.01); *G08G 1/0962* (2013.01)

(58) Field of Classification Search
CPC ...... B60K 2370/175; B60W 2050/146; B60W 2552/00; B60W 2554/00; B60W 2555/60;
(Continued)

(56) References Cited

U.S. PATENT DOCUMENTS 7,840,345 B2 * 11/2010 Miyoshi ................. G01S 19/48
701/438
9,828,001 B2 * 11/2017 Kusano ................. G06Q 10/00
(Continued)

FOREIGN PATENT DOCUMENTS

DE 102004059999 A1 7/2006
DE 102007029034 A1 12/2008
(Continued)

*Primary Examiner* — Babar Sarwar
(74) *Attorney, Agent, or Firm* — Barnes & Thornburg LLP

(57) ABSTRACT

A method for providing an automation function for a transportation vehicle, wherein environment data are detected. Based on the detected environment data, the automation function is activated and a quality measure is determined. A quality level on a multi-level scale is determined based on the quality measure, and a graphical output is generated and output. The output includes a quality display element that is formed based on the quality measure. Also disclosed is a system for providing an automation function for a transportation vehicle including a detection unit to detect environment data, an evaluation unit to activate the automation function and to determine a quality measure based on the detected environment data, and a control unit to generate a graphical output and to output the graphical output by a display unit. The output includes a quality display element formed based on the quality measure.

20 Claims, 2 Drawing Sheets

(58) Field of Classification Search
CPC ............ B60W 2556/20; B60W 30/12; B60W 50/082; B60W 50/14; B62D 15/026; G01C 21/3691; G08G 1/0962
See application file for complete search history.

(56) References Cited

U.S. PATENT DOCUMENTS

| | | | | |
|---|---|---|---|---|
| 2006/0002587 A1* | 1/2006 | Takahama | ............... | G08G 1/167 382/103 |
| 2006/0022811 A1* | 2/2006 | Haug | ................ | B60R 1/00 340/436 |
| 2010/0001883 A1* | 1/2010 | Koenig | ................ | G08G 1/161 340/988 |
| 2012/0215377 A1* | 8/2012 | Takemura | ............. | B60W 30/12 701/1 |
| 2013/0231830 A1* | 9/2013 | Van Dan Elzen | .... | B60W 10/04 701/42 |
| 2014/0222277 A1* | 8/2014 | Tsimhoni | ............... | B60K 35/00 701/23 |
| 2014/0342790 A1* | 11/2014 | Kim | ..................... | A63F 13/803 463/6 |
| 2015/0314780 A1* | 11/2015 | Stenneth | .............. | G05D 1/0061 701/23 |
| 2015/0325127 A1* | 11/2015 | Pandita | ................. | G08G 1/166 701/431 |
| 2015/0375752 A1* | 12/2015 | Carlsson | ............... | B60W 40/06 702/5 |
| 2017/0038774 A1* | 2/2017 | Ebina | ................... | B60W 40/08 |
| 2017/0212515 A1* | 7/2017 | Bertollini | ............. | G05D 1/021 |
| 2017/0291615 A1* | 10/2017 | Kusano | ................ | G07C 5/0808 |

FOREIGN PATENT DOCUMENTS

| | | |
|---|---|---|
| DE | 102009048954 A1 | 4/2011 |
| DE | 102012009005 A1 | 11/2012 |
| DE | 102011082398 A1 | 3/2013 |
| DE | 102012101686 A1 | 9/2013 |
| DE | 102014201965 A1 | 8/2014 |
| DE | 102013110909 A1 | 4/2015 |
| DE | 102015201039 A1 | 6/2016 |
| DE | 102015206969 A1 | 10/2016 |
| DE | 102017100763 A1 | 8/2017 |

* cited by examiner

METHOD AND SYSTEM FOR PROVIDING AN AUTOMATION FUNCTION FOR A TRANSPORTATION VEHICLE

PRIORITY CLAIM

This patent application claims priority to German Patent Application No. 10 2018 207 869.6, filed 18 May 2018, the disclosure of which is incorporated herein by reference in its entirety.

SUMMARY

Illustrative embodiments relate to a method and a system for providing an automation function for a transportation vehicle.

BRIEF DESCRIPTION OF THE DRAWINGS

The disclosed embodiments will now be explained with reference to the drawings.

DETAILED DESCRIPTION

Figure 1:
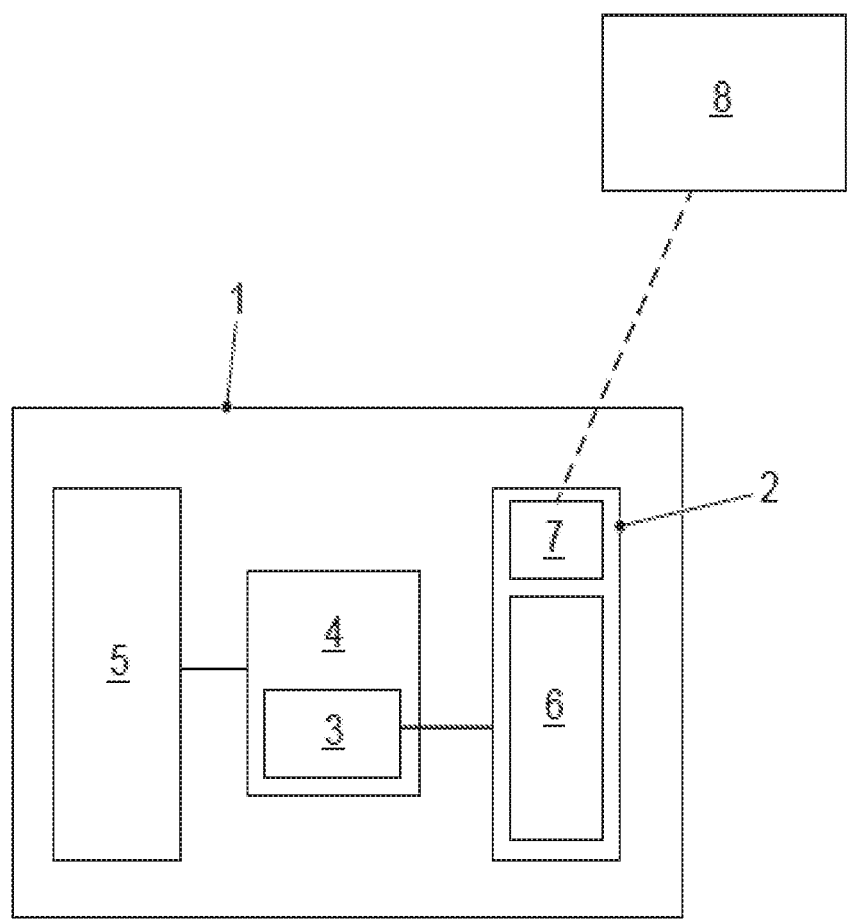
FIG. 1 shows a transportation vehicle with an exemplary embodiment of the disclosed system.

Driver assistance systems having a multiplicity of automation functions are typically offered in modern transportation vehicles. A driver assistance system is understood to mean a device of a transportation vehicle which assists the driver in driving the transportation vehicle. Driver assistance systems within the meaning of the disclosure assist the driver, in particular, by automation functions that influence the locomotion of the transportation vehicle. In this way, various parameters of the locomotion of the transportation vehicle can be regulated and automatic interventions can be effected.

Without driver assistance systems, the driver directly influences the movement of the transportation vehicle. At most signals or movements of operating elements actuated by the driver, such as the pedals, the gear shift or the steering wheel, are transmitted to corresponding devices of the transportation vehicle which influence the locomotion of the transportation vehicle. Such locomotion of the transportation vehicle corresponds to the lowest degree of automation. In the case of a higher degree of automation, interventions are made in part automatically in devices which are used for the locomotion of the transportation vehicle. By way of example, interventions are made in the steering of the transportation vehicle or acceleration in a positive or negative direction.

In the case of an even higher degree of automation, interventions are made in devices of the transportation vehicle to an extent such that specific types of locomotion of the transportation vehicle, for example, travel straight ahead, can be performed automatically. In the case of the highest degree of automation, routes of a navigation system can be driven substantially automatically. In this case, however, it is typically ensured that, even in the case of a high degree of automation, the driver can immediately regain control of the transportation vehicle guidance by active steering or actuation of the pedals.

Furthermore, driver assistance systems can fulfill various safety functions. In the case of a particularly low degree of automation, information that influences the driver in the way in which the latter moves the transportation vehicle can be output to the driver, for instance. In addition, warnings that require an immediate reaction of the driver can be output by safety functions. In the case of this degree of the safety functions, however, the driver assistance modules do not intervene actively and automatically in the function of the devices which influence the locomotion of the transportation vehicle.

In the case of a higher degree of the safety functions, interventions are made in part automatically in devices which are used for the locomotion of the transportation vehicle. By way of example, interventions are made preventively in the steering of the transportation vehicle or the acceleration in a positive or negative direction. In the case of an even higher degree of the safety functions, interventions are made in devices of the transportation vehicle which influence the locomotion of the transportation vehicle to an extent such that specific maneuvers of the transportation vehicle can be performed automatically, such as, for example, full braking or a targeted evasive maneuver to avoid leaving the roadway or a collision.

Driver assistance systems can thus make the driver aware of specific hazards, thereby increasing safety in the driving of the transportation vehicle. In the case of an active intervention in the locomotion of the transportation vehicle by a driver assistance module, dangerous driving situations such as collisions or uncontrolled movements of the transportation vehicle can be avoided even if the driver does not intervene directly in the driving situation. In the case of the safety functions of the driver assistance system, however, the driver always maintains full control and responsibility vis-à-vis the driving situation.

DE 10 2012 009 005 A1 describes a method for using quality measures for traffic-relevant information. The traffic-relevant information is received from various information sources, assigned a quality measure and used in a navigation system or driver assistance system. In this case, the quality measure of the traffic-relevant information used is displayed.

DE 10 2012 101 686 A1 proposes a method for a driver assistance system for autonomous longitudinal and transverse regulation. The assistance of the driver can be effected to different extents and depends on various conditions. If a regulation task cannot be undertaken reliably, then the driver is informed of this.

The disclosed embodiments provide a method and a system for providing an automation function for a transportation vehicle in which the driver can rapidly and easily detect to what extent automation functions intervene in the control of the transportation vehicle.

In the disclosed method of the type mentioned in the introduction, environment data are detected. Depending on the detected environment data, the automation function is activated and a quality measure is determined. In this case, a quality level on a multi-level scale is determined on the basis of the quality measure. A graphical output is generated and output, wherein the output comprises a quality display element, which is formed depending on the quality measure.

The driver can thereby easily recognize how well the automation function is implemented. This makes it easier for the driver to direct his/her attention to the driving tasks whose monitoring currently has the highest priority.

The automation function serves to undertake at least one driving function autonomously. This involves a driving function for controlling the movement of the transportation vehicle, for instance, in the transverse or longitudinal direction. By way of example, it is possible automatically for a specific lane to be kept or for leaving a roadway to be prevented.

Upon activation of the automation function, a degree of automation is set. This can be effected, for example, on the basis of SAE levels (Society of Automotive Engineers), which attain different degrees of automation of 0 (no automation), 1 (assistance during driving), 2 (partial automation) and 3 (automation under specific conditions). A specific degree of automation is set if sufficient data are available in sufficient quality for carrying out such a driving function.

The quality measure determined depending on the detected environment data indicates with what quality, in particular, how reliably and safely, the activated automation function can be performed. That is to say that although the quality of the detected environment data per se can be taken into account in the determination of the quality measure, the quality measure per se relates to the functioning and functionality of the automation function. Conditions which are checked in the determination of the quality measure may be, for example, whether specific orientation points in the course of the road can be detected and evaluated, for example, a road edge, a road marking, a position mark or a traffic sign.

In the method, a quality level is determined on the basis of the quality measure. In this case, one of a plurality of levels of a scale is assigned to the quality measure determined. The quality measure can have a more complex structure concerning different facets of the quality of the automation function, for instance, different partial functionalities. By way of example, it is possible to carry out a linear mapping of the quality measure with a subsequent discretization to map a continuously formed value of the quality measure onto a quality level. By determining the quality level, it is possible to reduce the complexity of this information, such that an easily and rapidly comprehensible and detectable quality level on a scale of, for example, 0 to 4 can be output.

In at least one exemplary embodiment of the disclosed method, the output can furthermore comprise an automation indicator, wherein the automation indicator indicates the activated automation function. The user can thereby rapidly recognize what automation function is activated and what driving functions are thus controlled automatically by the system. The method can provide for the automation function to be activated automatically. Furthermore, provision can be made for the activation to be effected manually or for an automatic activation to have to be confirmed manually.

In a further disclosed embodiment, the environment data are detected by environment sensors of the transportation vehicle and/or received via a data-technological connection. As a result, a wide variety of types of environment data can be detected and made available.

In principle, all environment sensors known per se can be used. Optical, infrared, radar, lidar or ultrasonic sensors are provided. Furthermore, it is possible to use methods known per se for conditioning detected environment data in a first operation, for example, for extracting relevant features within the detected environment. Such features can constitute markings or signs for traffic regulation and for marking traffic routes.

By detecting environment data via a data-technological connection, it is possible to use, for example, data sources via a network, for instance, an external server or a network in the manner of a so-called cloud. Alternatively or additionally, it is possible to use a Car-to-Car or a Car-to-Infrastructure communication to receive environment data from other transportation vehicles or devices of a traffic infrastructure. Here it is possible to store various features about a traffic route and traffic regulations, in particular, in conjunction with highly accurate maps comprising information about journey-relevant features for specific positions along a traffic route or a geographical structure.

In one development of the method, the environment data concern a lane, a roadway marking, a roadway edge, a traffic sign and/or a further transportation vehicle in the surroundings of the transportation vehicle. As a result, such environment data which are of particular relevance for controlling the movement of the transportation vehicle are detected and provided.

The environment data can furthermore comprise, in principle, any other types of information concerning the traffic-relevant environment of the transportation vehicle. By way of example, the environment data can concern further transportation vehicles traveling ahead of or behind the ego transportation vehicle; in addition, transportation vehicles localized in adjacent lanes can be relevant, for instance, for a lane change or an overtaking maneuver, wherein both transportation vehicles traveling in the same direction of travel and oncoming transportation vehicles can be relevant. Furthermore, the environment data can concern other road users, in particular, cyclists or pedestrians.

The environment data can comprise data about climatic conditions, special events such as, for instance, roadworks, the surrounding traffic, special destinations in the surroundings of the transportation vehicle or a planned route (Points of Interest, POI) or further information. The environment data can be detected depending on what automation function is activated or is intended to be activated. The information that the environment data comprise can then be adapted to what data are required for safe operation of the respective automation function.

Furthermore, provision can be made for the environment data to comprise "swarm data" or a "swarm trajectory", which are received from an external service, for instance, a server or a cloud service. In this case, "swarm data" denotes transportation vehicle data from further transportation vehicles which have already passed the same position previously and have transmitted their data (for instance, speed, position relative to the roadway or lane, offset within a lane) to a central unit, for instance, the external service. "Swarm trajectory" denotes a movement path which is determined on the basis of the data from further transportation vehicles which have already traveled along the section and, in particular, the same lane previously. The swarm trajectory also comprises information about the speed at which travel took place.

The spatial course and/or the speed of travel are/is taken into account in the generation and/or evaluation of the swarm trajectory. The determination is effected, for instance, on the basis of the current position of the transportation vehicle, which is determined with an accuracy such that the lane traveled or a position within the lane traveled is determined. By way of example, the position can be determined for this purpose by data of a camera and on the basis of landmarks. Particularly relevant environment data are provided in this way. The implementation of the automation function takes into account where the further transportation vehicles have traveled along the section, in particular, for automatic transverse regulation, and/or how fast they have traveled along the section, in particular, for automatic longitudinal regulation. In this case, in the evaluation of the swarm data and in the determination of the swarm trajectory it is possible to determine where and in what way the majority of the further transportation vehicles traveled in the lane. Proceeding from the current position of the transportation vehicle, therefore, by way of an external service, for instance, a could service, a path is obtained with information about with what spatial course and at what speed other transportation vehicles traveled in the lane.

In at least one disclosed embodiment, the quality measure indicates a reliability of the activated automation function. The quality level determined on the basis of the quality measure also indicates such a reliability. As a result, the driver can rapidly and dependably detect with what reliability the activated automation function is operated and in what areas his/her increased attention is required for the additional monitoring of the journey.

The reliability of the automation function can be determined in a manner known per se, for example, on the basis of fixed rules defining conditions under which a reliability determined is assumed. By way of example, a reduced reliability can be assumed if specific types of information are not detected or are detected in insufficient quality or are not comprised by the environment data. By way of example, a lane keeping assistant can be operated with reduced reliability if no roadway markings are detected. Conversely, an increased reliability can be provided if a further transportation vehicle is detected in the surroundings of the ego transportation vehicle, for instance, a transportation vehicle traveling ahead or a transportation vehicle located in an adjacent lane.

The quality of the detected environment data can also affect the reliability of the activated automation function. By way of example, the automation function can function with maximum reliability if the environment data are detected with optimum quality, for example, if the detected data have a particularly low standard deviation. In this case, the data quality of the environment data can be determined in a manner known per se and taken into account in the determination of the quality measure.

In a further disclosed embodiment, the quality measure is formed depending on at least one of the following parameters: number or type of activated environment sensors of the transportation vehicle, detection accuracy of an environment sensor of the transportation vehicle, statistical or systemic errors in the detection of the environment data and/or reception of environment data via a data-technological connection. Provision can be made for the quality of the data per se to be assessed in a first operation for processing the detected environment data. As a result, it is possible to take account of different facets in the assessment of the environment data and the influence thereof on the quality measure.

By way of example, the quality measure can be determined by the availability of specific sensors or systems relevant to the automation function being defined as a condition for a quality measure determined. The quality measure can be determined as higher or lower depending on the availability of the relevant sensors or system. By way of example, the quality measure can be determined on the basis of the number of relevant sensors and systems which are available. Furthermore, provision can be made for a quality measure determined to be attainable only given the presence of a specific sensor or system.

Furthermore, the quality measure can be determined on the basis of a characteristic figure determined depending on the respective quality of the respective sensor information. The quality can be determined and quantified in a manner known per se, for instance, for the quality of a recognition of a right or left lane, the quality of navigation data or map data, the quality of information received from a cloud service, or for further data and data sources. In this case, different items of individual information can be weighted in the determination of the characteristic figure, wherein, for example, the relevance of the information to the activated assistance function is taken into account.

For the operation of the automation function, in particular, sensor data of different sources are utilized (for instance, radar, lidar, optical cameras, data of a navigation system, online data). By virtue of the fact that the method involves determining the quality measure for the automation function and outputting it as a quality level, the driver can also recognize whether and in what way the available data sources are sufficient for optimum operation of the automation function. Benefits of the use of specific data sources can be conveyed to the driver, for example, if the connection to transportation vehicle-external data sources, for instance, a server, contributes to improving the environment data and thus also the functioning of the automation function.

In at least one disclosed embodiment, if environment data are received by a data-technological connection, the graphical output furthermore comprises a data source symbol. This can be a cloud symbol, for example, to symbolize, for instance, the origin of environment data from a cloud system. The user can thereby easily recognize if a data-technological connection is used for encompassing the environment data.

In one development of the method, the quality display element comprises a bar chart. It can furthermore be embodied in some other way known per se, for example, by a pie chart, a partly or completely closed ring element, or a wedge having a variable thickness. The user can thereby intuitively recognize at a glance how the displayed quality level is embodied.

In at least one disclosed embodiment, at least partly autonomous transverse guidance and/or longitudinal guidance of the transportation vehicle are/is performed by the automation function. The automation function is thereby utilized for controlling particularly relevant driving functions.

Driving functions for transverse guidance of the transportation vehicle comprise measures concerning changes of direction, in particular, a steering angle, of the transportation vehicle. Driving functions for longitudinal guidance concern, in particular, an acceleration or a deceleration of the transportation vehicle. Transverse and longitudinal guidance can furthermore be controlled in combination with one another and be coordinated with one another.

Alternatively or additionally, the automation function can concern further driving functions, for example, control of the chassis of the transportation vehicle, light signals or guidance of the transportation vehicle along a route.

In one development, the output comprises a schematic representation of a roadway, wherein the schematic representation is generated on the basis of the environment data and comprises a graphical element generated depending on automatic control interventions in the transverse and/or longitudinal guidance of the transportation vehicle by the automation function. The schematic representation can be arranged below the further elements of the display in accordance with the method. As a result, relevant information for the transverse and longitudinal guidance of the transportation vehicle can be displayed schematically.

Information for implementing the automation function can be output on the basis of the schematic representation of the roadway and the graphical elements thereof. By way of example, it is possible to display whether and in what way a roadway marking or a further transportation vehicle in the surroundings was detected. Furthermore, the activity of the automation function, for instance, of a lane keeping assistant, can be output, for instance, by a displayed feedback message, if the system intervenes in the control of the transportation vehicle and alters the steering angle by the automation function.

In one development, an acoustic or haptic output is furthermore generated. The output is thereby detectable rapidly for the driver by a plurality of senses. An acoustic or haptic output can be effected in a manner known per se.

Provision can be made for a further graphical, acoustic and/or haptic output to be generated if a change in the quality measure, in particular, a deterioration, is detected. This is of importance if a safety-relevant automation function is dependent on the changing, in particular, the deteriorating, quality. By way of example, in this way the driver can be made aware that he/she must observe the work of the automation function with higher attention, if appropriate, to be able to intervene rapidly and safely.

The disclosed system of the type mentioned in the introduction comprises a detection unit for detecting environment data, and an evaluation unit configured, depending on the detected environment data, to activate the automation function and to determine a quality measure. The system furthermore comprises a control unit configured to generate a graphical output and to output the latter by a display unit. In this case, the output comprises a quality display element, wherein the quality display element is formed depending on the quality measure.

The disclosed system is designed to implement the above-described method. The disclosed system thus has the same benefits as the disclosed method.

The display unit is embodied in a manner known per se. It can comprise a display, for example, such as is usually arranged on the center console of transportation vehicles. Alternatively or additionally, the display unit can comprise a head-up display or a display in the instrument cluster of the transportation vehicle. It can furthermore comprise a display by a transportation vehicle-external display element, for example, by a cellular phone connected to the system data-technologically.

In one development of the system, the detection unit comprises environment sensors of the transportation vehicle and/or an interface for receiving environment data via a data-technological connection. Sources of environment data of various types can be used as a result.

In at least one exemplary embodiment of the disclosed system, the display furthermore comprises an automation indicator that indicates the activated automation function. As a result, the activated automation function which is currently activated is shown clearly. Alternatively or additionally, the display can comprise a data source symbol, for example, a cloud symbol, particularly if environment data are detected by a data-technological connection.

In a further disclosed embodiment, the system furthermore comprises an input unit, by which an input by a user is detectable. By way of example, by this input, an automation function can be selected and activated or deactivated. An input request can be output in this case, by which input request a user is requested, for example, to confirm the activation or deactivation of an automation function.

The input unit can be embodied here in a manner known per se, in particular, by a touchscreen, by which the input unit is combinable with the display unit. Alternatively or additionally, some other input methods or mechanisms known per se can be used, for example, for input by a graphical interface output by the display unit.

A first exemplary embodiment of the disclosed system will be explained with reference to FIG. 1.

A transportation vehicle 1 comprises a detection unit 2, which in turn comprises environment sensors 6 and an interface 7. The interface 7 makes it possible to establish a data-technological connection to an external server 8, a cloud service 8 in the example illustrated. The detection unit 2 is coupled to an evaluation unit 3 comprised by a control unit 4. Furthermore, the control unit 4 is coupled to a display unit 5.

Figure 2:
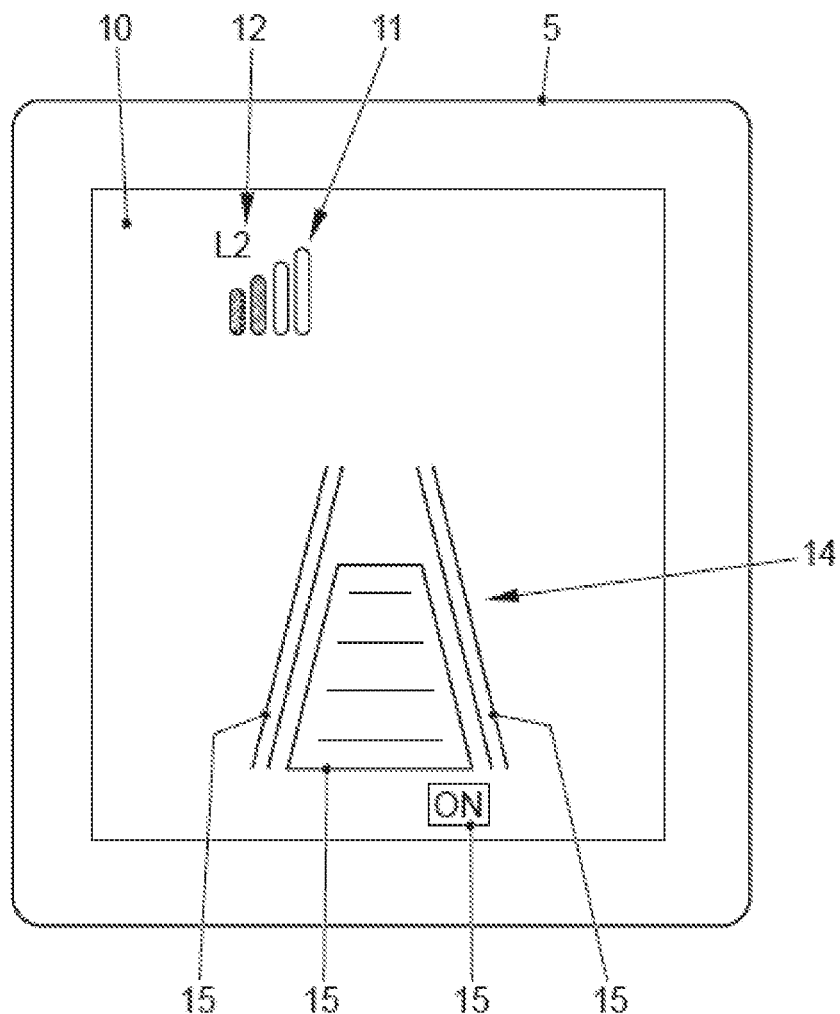
FIG. 2 shows an exemplary embodiment of the output generated in the disclosed method.

At least one exemplary embodiment of the disclosed method will be explained with reference to FIGS. 1, 2 and 3. The exemplary embodiment of the disclosed system as explained above with reference to FIG. 1 is taken as a basis here.

Environment data are detected by the detection unit 2 of the system. For this purpose, the environment sensors 6 of the transportation vehicle 1 are used in a manner known per se, which environment sensors can comprise radar, lidar and ultrasonic sensors in the exemplary embodiment. Furthermore, an optical camera or some other sensor can be comprised. Supplementary to this, in the exemplary embodiment, environment data are received by a data-technological connection of the interface 7 to the cloud service 8.

In a further exemplary embodiment, provision can be made for data of the transportation vehicle 1 also to be transmitted via the interface 7, for instance, environment data, data of the environment sensors 6 or further data of the transportation vehicle 1, in particular, also data detected by an input by a user. The data can then be stored and/or processed, for example, by an external server or the cloud service 8.

The detected environment data comprise such data on the basis of which traffic-relevant features of the environment of the transportation vehicle 1 can be recognized. They include, for example, position, course and boundary of a lane or a roadway, a roadway marking, a roadway edge, a traffic sign and/or a further transportation vehicle in the surroundings. In this case, the environment data are detected such that they comprise data which are traffic-relevant or relevant to the journey of the transportation vehicle 1. By way of example, the environment sensors 6 used for the detection can be selected such that relevant data are detected and the detection of an unnecessarily large amount of data is avoided. The exemplary embodiment provides for traffic-relevant information already to be extracted by preprocessing by the detection unit 2, such that the environment data transmitted to the evaluation unit 3 comprise relevant information in a form that can be processed efficiently. The evaluation unit 3 receives the environment data and activates at least one automation function. In this case, a decision is taken about the activation of a specific function depending on what environment data are present and in what quality these data are detected. Furthermore, a quality measure is determined, which indicates how reliably the automation function can be performed.

The evaluation unit 3 determines the quality measure such that not only does the latter give information about the quality of the detected environment data per se, but there is determination of what environment data are present in what quality and how this affects the functioning of the automation function. By way of example, it is possible to determine the sensors and/or data sources by which the environment data were detected, and the quality measure can be assigned to specific sensors and/or combinations thereof. Depending on the quality measure, a more or less attentive monitoring of the functioning of the automation function by the driver of the transportation vehicle 1 is required to ensure safe operation of the transportation vehicle.

A quality level is furthermore determined on the basis of the quality measure. While the quality measure is determined in the exemplary embodiment such that it comprises information for different automation functions or for various facets of automated functions of the transportation vehicle 1, the quality level constitutes a simpler assessment on a multi-level scale. The scale comprises the levels 0 to 4 in the exemplary embodiment, although levels 0 to 10, 1 to 10 or other stepped scales can also be used in further exemplary embodiments. In a further exemplary embodiment, the scale can be formed continuously, for example, from 0 to 1, 0 to 10 or in a similar way.

In the exemplary embodiment, determining the quality measure involves determining what environment sensors 6 relevant to the automation function are available. The quality measure is higher or lower depending on the number of available environment sensors 6. In this case, the quality measure is all the higher, the more environment sensors 6 are available. By way of example, the quality measure is all the higher, the more different items of information can be detected, for instance, the recognition of a lane marking, a transportation vehicle ahead or access to data of the cloud service 8.

It can also be provided that a specific quality measure can be attained only given the presence of a specific environment sensor 6. Conversely, it can be provided that a specific quality measure is automatically attained independently of other sensors and systems whenever a specific environment sensor 6 is available.

The control unit 4 generates a graphical output 10 and transmits it to the display unit 5, where it is output. In the exemplary embodiment, the display unit 5 comprises a display known per se. In a further exemplary embodiment, a touch-sensitive film is arranged on the display, that is to say that the display unit 5 is embodied as a touchscreen and can be used for detecting user inputs.

In further exemplary embodiments, the display unit 5 can alternatively or additionally comprise an area of the instrument cluster of the transportation vehicle 1 or a head-up display. It can furthermore comprise a transportation vehicle-external display unit, for example, a cellular phone having a display.

The graphical output 10 comprises a quality display element 11, which is embodied as a bar chart in the exemplary embodiment. In further exemplary embodiments, other forms of representation are possible, for example, a pie chart, a partly or completely closed ring or other forms.

In the exemplary embodiment, the quality display element 11 comprises four bars arranged upright next to one another, wherein their length increases from left to right. The bars can be represented as contours or as filled structures; however, two different forms of representation can alternatively or additionally be differentiated in some other way, for example, by a different brightness, color or a dynamic effect, for instance, by flashing. In this way, in the exemplary embodiment, integer values of 0 to 4 can be output, wherein four bars represented only by contours correspond to the value "0", while in the case of the value "4" all four bars are represented as filled in. Intermediate values are accordingly represented with a number of bars filled in, while the rest of the bars are represented only by contours. This form of representation is illustrated for the values 0, 1, 2, 3 and 4 in FIGS. 3A to 3E.

The output 10 furthermore comprises an automation indicator 12, which gives information about the activated automation function. In the cases illustrated in FIGS. 3A to 3E, the automation functions are indicated as L1, L2 and L2+, respectively. In other exemplary embodiments other designations, symbols or mixtures thereof can be used.

In the exemplary embodiment, the different automation functions correspond to different degrees of automation. In the case illustrated in FIG. 3A, the indication "L1" denotes a minimum degree of automation. In the case indicated in FIGS. 3B, 3C and 3D, the indication "L2" denotes partly autonomous control of the transportation vehicle in the transverse direction, in particular, by a lane keeping assistant. The latter recognizes the boundaries of the lane currently being used and controls the transportation vehicle such that it does not leave the lane. In the case illustrated in FIG. 3E, the indication "L2+" denotes that the automatic transverse guidance of the transportation vehicle 1 is carried out by the lane keeping assistant, wherein environment data received from the external server 8 are also taken into account in addition to the transportation vehicle's own sensors 6. To display the use of this data source, the data source symbol 13 is furthermore displayed. The latter is embodied, in the exemplary embodiment, as a schematically represented cloud symbolizing the use of a cloud service 8. The data source symbol 13 can be embodied differently in further exemplary embodiments. Furthermore, a different symbol can be output if there is no data-technological connection or no environment data are received via the connection.

Figures 3A, 3B, 3C, 3D, 3E:
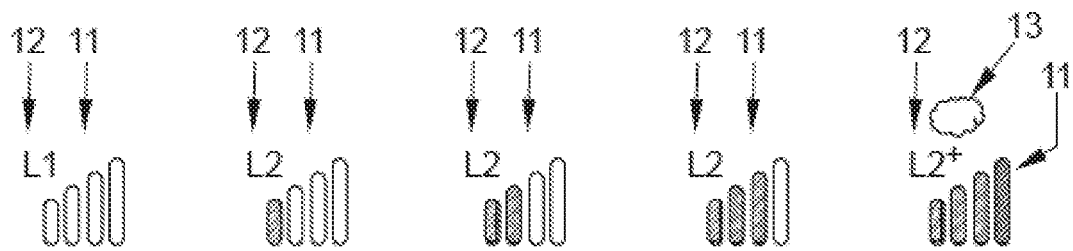
FIGS. 3A to 3E show further exemplary embodiments of the output generated in the disclosed method.

FIGS. 3A to 3E illustrate the quality display element 11 in the states which it adopts for the quality levels 0 to 4. Given activated transverse guidance of the transportation vehicle 1, the quality levels can vary from 1 (FIG. 3B) to 4 (FIG. 3E). Since, in the exemplary embodiment, the quality levels indicate a reliability of the activated automation function, in the cases illustrated the driver can recognize to what extent he/she must monitor the functioning of the automatic transverse guidance and with what probability it should be expected that manual interventions will become necessary. This enables the driver to concentrate on those driving tasks for which no or only less reliable automatic assistance is available.

In the exemplary embodiment, the graphical output furthermore comprises a schematic representation 14 representing the state of the activated lane keeping assistant. The schematic representation 14 comprises graphical elements 15, which, in the exemplary embodiment illustrated in FIG. 2, comprise two roadway markings bounding a lane. In this case, the system has recognized two markings of this type at the edges of the road in front of the transportation vehicle. The representation furthermore includes a marking of the roadway region in front of the transportation vehicle, which indicates to the driver that it is possible to travel along this region safely and it can be assumed, for example, that there will not be a collision with another road user. Furthermore, in the example illustrated here, the fact that the lane keeping assistant is activated as automation function is represented by the display "ON". In further exemplary embodiments or in other cases of use of the lane keeping assistant, the schematic representation may be embodied differently, for example, with only one recognized lane marking or with a different type of lane marking, for instance, because only an unmarked roadway edge was detected or because different markings, for instance, solid or broken lines, were detected. Furthermore, the lane keeping assistant can be deactivated, wherein the marking "OFF" can be displayed. This can be effected, for example, in the case of excessively low reliability of the automation function as illustrated in FIG. 3A.

In a further exemplary embodiment, an acoustic or haptic output can furthermore be provided, which is output in addition to the graphical output. Provision can be made for such an additional output to be effected if the quality measure changes, in particular, if the quality deteriorates. By way of example, additional graphical, acoustic and/or haptic outputs can be generated if deterioration of the quality level for the implementation of an automation function is detected. The user can thereby be made aware clearly that a safety-relevant automation function with a lower reliability is being operated and, accordingly, higher attention should be devoted to the monitoring of the automation function.

LIST OF REFERENCE SIGNS

1 Transportation vehicle
2 Detection unit
3 Evaluation unit
4 Control unit
5 Display unit
6 Environment sensors
7 Interface
8 External Server; Cloud Service
10 Output
11 Quality display element
12 Automation indicator
13 Data source symbol
14 Schematic representation
15 Graphical element

The invention claimed is:

1. A system including a processor and non-transitory memory storing computer executable instructions configured to carry out a method for providing automation functionality for a transportation vehicle, the method comprising:
detecting environment data via a detection unit including environment sensors of the transportation vehicle;
activating the automation functionality and determining a quality measure based on a capability of the detected environment data to provide the automation functionality of the transportation vehicle; and
generating a graphical output and outputting the graphical output by a display unit,
wherein the output comprises a quality display element,
wherein the quality display element is formed based on the quality measure that indicates a reliability of the activated automation functionality, and
wherein the reliability of the activated automation functionality is determined based on an availability of a predetermined number of environmental data and an availability of a predetermined number of the environmental sensors.

2. The system of claim 1, wherein the detection unit comprises an interface for receiving the environment data via a data connection.

3. The system of claim 1, wherein the environment data concern a lane, a roadway marking, a roadway edge, a traffic sign and/or a further transportation vehicle in the surroundings of the transportation vehicle.

4. The system of claim 1, wherein the reliability of the activated automation functionality is further determined based on the environmental data having a standard deviation below a predetermined number.

5. The system of claim 1, wherein the quality display element comprises a bar chart.

6. The system of claim 1, wherein at least partly autonomous transverse guidance and/or longitudinal guidance of the transportation vehicle are/is performed by the automation functionality.

7. The system of claim 6, wherein the output comprises a schematic representation of a roadway, and wherein the schematic representation is generated based on the environment data and comprises a graphical element generated based on automatic control interventions in the transverse and/or the longitudinal guidance of the transportation vehicle by the automation functionality.

8. The system of claim 1, wherein an acoustic or haptic output is generated.

9. The system of claim 1, wherein the environmental data further includes data received by the transportation vehicle as swarm data, the swarm data being transportation vehicle data from further transportation vehicles which have previously passed a section of route that the transportation vehicle is traveling on.

10. The system of claim 1, wherein the determination of the quality measure is further based on at least one of a type of activated environment sensors of the transportation vehicle, a detection accuracy of an environment sensor of the transportation vehicle, and a statistical or a systemic error in the detection of the environment data.

11. A method for providing automation functionality for a transportation vehicle, the method comprising:
detecting environment data via environment sensors of the transportation vehicle;
activating the automation functionality;
determining a quality measure based on a capability of the detected environment data to provide the automation functionality of the transportation vehicle, wherein a quality level on a multi-level scale is determined based on the quality measure; and
generating and outputting a graphical output, wherein the output comprises a quality display element,
wherein the quality display element is formed based on the quality measure that indicates a reliability of the activated automation functionality, and
wherein the reliability of the activated automation functionality is determined based on an availability of a predetermined number of environmental data and an availability of a predetermined number of the environmental sensors.

12. The method of claim 11, further comprises:
receiving data via a data connection,
wherein the environment data are further detected based on the received data.

13. The method of claim 11, wherein the environment data concern a lane, a roadway marking, a roadway edge, a traffic sign and/or a further transportation vehicle in the surroundings of the transportation vehicle.

14. The method of claim 11, wherein the reliability of the activated automation functionality is further determined based on the environmental data having a standard deviation below a predetermined number.

15. The method of claim 11, wherein the quality display element comprises a bar chart.

16. The method of claim 11, wherein at least partly autonomous transverse guidance and/or longitudinal guidance of the transportation vehicle are/is performed by the automation functionality.

17. The method of claim 16, wherein the output comprises a schematic representation of a roadway, and wherein the schematic representation is generated based on the environment data and comprises a graphical element generated based on automatic control interventions in the transverse and/or the longitudinal guidance of the transportation vehicle by the automation functionality.

18. The method of claim 11, wherein an acoustic or haptic output is generated.

19. The method of claim 11, wherein the environmental data further includes data received by the transportation vehicle as swarm data, the swarm data being transportation vehicle data from further transportation vehicles which have previously passed a section of route that the transportation vehicle is traveling on.

20. The method of claim 11, wherein the determination of the quality measure is further based on at least one of a type of activated environment sensors of the transportation vehicle, a detection accuracy of an environment sensor of the transportation vehicle, and a statistical or a systemic error in the detection of the environment data.

\* \* \* \* \*